Patented Sept. 12, 1944

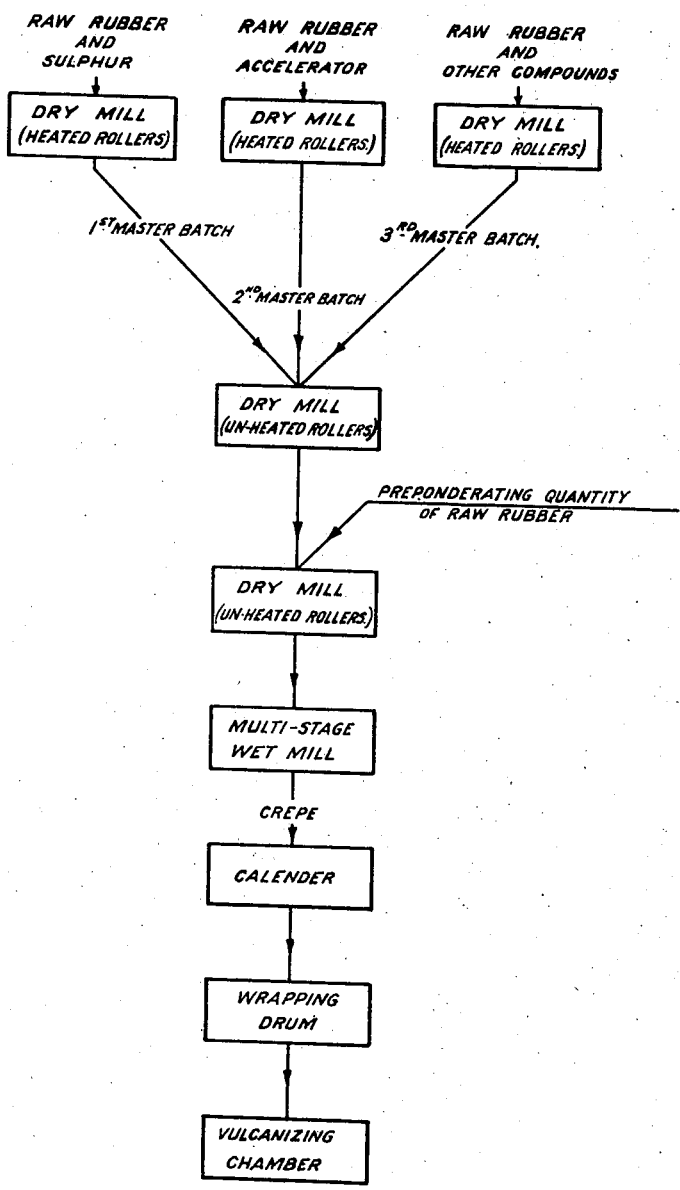

2,358,195

UNITED STATES PATENT OFFICE 2,358,195

MANUFACTURE OF RUBBER IN SHEET OR CREPE FORM AND OF RUBBER ARTICLES

Bernard Wilkinson, Geoffrey Dennis Ingram, and Harry Waumsley, London, England; said Wilkinson assignor to Wilkinson Rubber Linatex Limited, London, England, a company of Great Britain, and said Ingram and said Waumsley assignors to J. G. Ingram & Son Limited, London, England, a company of Great Britain Application April 18, 1942, Serial No. 439,600
In Great Britain June 6, 1941

6 Claims. (Cl. 260—775)

The usual practice in the manufacture of rubber sheets and articles from raw rubber consists in masticating the rubber on a dry mill, and incorporating with it the compounds necessary for vulcanisation during the treatment on the dry mill. The action of the dry mill strongly heats the rubber, converting it to a soft condition in which the required uniform dissemination of the compounds throughout the mass can be obtained. The action of the mill on the heated rubber however causes a drastic breaking down in the structure of the raw rubber, with consequent reduction in strength, with the result that vulcanised sheets or articles made by this process are not resistant to tear. The objects of this invention are to provide an improved product, consisting of rubber having a reduced susceptibility to tearing and other advantageous properties, and an improved process of manufacture whereby such products may be produced.

The invention is based on the appreciation of the fact that the tendency of the rubber to tear can be considerably reduced by avoiding excessive heating of the rubber and breaking down of its structure during the operations of mixing the compounds with it and processing it to crepe or sheet form. The invention accordingly provides a process for the manufacture of tear-resistant rubber from raw rubber, which comprises effecting intimate admixture with the rubber of the compounds required for vulcanisation and conversion of the mix into crepe or sheet form by steps such that the destructive tearing action and flow-producing heating of the usual mastication process are avoided so far as possible, so that, in the resulting crepe or sheet, the major portion at least of the rubber remains substantially unmasticated and therefore retains the structure of raw rubber, and thereafter vulcanising the rubber. The crepe or sheet produced consists of a matrix of substantially unmasticated rubber, having distinguishable particles of corresponding material embedded therein and distributed therethrough with sufficient uniformity to ensure effective vulcanization.

It is preferred to prepare a master batch, consisting of a concentrated mixing of raw rubber and the compounds required for vulcanisation, and to admix the master batch (or a portion thereof) with a larger quantity of raw rubber, the mixing operation and the processing of the mix to crepe or sheet form being performed under conditions such that excessive heating and breaking down into plastic condition of the material are avoided and a product is produced in which particles of master batch containing the vulcanising compounds are distributed with substantial uniformity throughout a mass of rubber, the bulk of which is substantially unmasticated and therefore of substantially unbroken structure.

The processing of the mix is best performed on a wet mill, such as is normally used for washing raw rubber, and the master batch can be incorporated during the operation of forming the rubber into the crepe on the wet mill. We find however, that the operation of distributing the compounds to the required degree of uniformity on the wet mill can be performed much more quickly if, as a preliminary, the master batch is caused to stick to the raw rubber by passage of these materials a few times through the rolls of a dry mill. The rolls are not heated, as is customary for mastication, and this treatment will only cause the rubber to assume a slight surface warmth and will not involve any breaking down of its structure or substantial mastication. The master batch will be distributed in largish patches over the rubber, and this is found to expedite considerably the operation of processing on the wet mill to obtain a crepe in which the compounds are distributed with sufficient uniformity throughout the mass. The rolls of the wet mill are flooded with water which acts as a lubricant and prevents the rolls from exerting sufficient frictional grip on the rubber to exercise a destructive tearing action thereon or cause any substantial heating or flow. Indeed they exert merely a pinching action on the rubber which, although effective to disintegrate the rubber into particles which adhere together by their natural tackiness to form a crepe and to secure the desired quite uniform dissemination of the compounds, does not appreciably masticate the rubber.

It is preferred to prepare the master batch by mastication on a dry mill, and although in this case that proportion of the rubber in the final product which is derived from the master batch will have its structure broken down, the bulk of the rubber will be substantially unmasticated because of the action of the wet mill as above-described. The material, after vulcanisation, therefore exhibits an improved resistance to tearing as compared with the products at present on the market made by the normal masticating process. The master batch may however be prepared in any other convenient way, for example in a solution mill, or by incorporating the compounds in latex and coagulating and drying or simply drying the latex. The resulting crepe exhibits quite different properties from a rubber sheet produced by mastication on a dry mill. Thus, it does not have the plasticity of a masticated sheet. Also, a vulcanized rubber sheet made according to the invention is readily distinguishable in appearance from a vulcanized sheet made from the same ingredients by the ordinary mastication process. Our product is heterogeneous in the sense that particles of compounding material and of master batch carrying the same can be distinguished, embedded in and distributed through the mass of substantially unmasticated rubber. This characteristic of the product is particularly marked when, as is usually the case, the compounds have a distinctive colour different from that of the rubber. The distinctiveness of the compound-carrying particles can however be observed in the absence of different colour of the compounds. The described characteristic of the product is, no doubt, due to the lack of plasticity of the rubber when the master batch is mixed therewith.

The vulcanized rubber product is effectively vulcanized, despite the fact that vulcanizing compounds are still distinguishable therein, this doubtless being due to the well-known fact that sulphur and accelerators can migrate to some extent during the vulcanization operation, and so ensure vulcanisation of the matrix. The product obtained by the ordinary mastication process is, to all appearance, completely homogeneous.

After the treatment on the wet mill it is desirable to compress the product, preferably after lamination, to seal up holes in the structure and eliminate subsequent shrinkage. This may be done by passing the product between rollers or in a press.

At this stage the product may exihibit a rough surface, and it is desirable to remove this. This may be done by drum wrapping, i. e. by wrapping the sheet of rubber around a cylinder with a layer of cloth or other flexible material interleaved between the coils of the spiral so formed, the cloth being under tension and serving to apply pressure to rubber. The wrapped cylinder is then introduced into a vulcanising chamber if it is desired to obtain the final product in sheet form. In some cases however the cylinder may itself be heated to an extent sufficient to effect vulcanisation.

Where it is desired to form the product into articles, these may be formed from the crepe produced by the wet mill after drying, and then moulded and cured. Alternatively the articles may be formed after the compression stage, or, if desired, after drum wrapping.

If the accelerator or accelerators used are of such a character that curing is likely to take place during the making of the master batch on the dry mill, separate master batches should be made, one consisting of a mixing of the rubber and sulphur and the other of a mixing of the rubber, activator, accelerator or accelerators, colouring matter or other compounds required, portions of both these master batches afterwards being incorporated with the bulk of the rubber as described above. In some cases it may even be desirable to divide the various compounds among three or more master batches. Where two or more master batches are used, it is preferred to amalgamate portions of the several master batches by passing a few times through a dry mill with unheated rolls before mixing with the bulk of the raw rubber. This will not develop sufficient heat in the rubber to cause premature curing.

One detailed example of how the invention may be carried into effect will now be given with reference to the flow sheet shown in the accompanying drawing.

A first master batch was prepared by masticating on a dry mill 24 lbs. of raw rubber and mixing with it 4 lbs. of sulphur giving a masticated batch of total weight 28 lbs.

A second master batch was prepared by masticating on a dry mill 24 lbs. of raw rubber, and mixing with it 6 lbs. of tetramethyl-thiuram-disulphide accelerator, giving a masticated batch of total weight 30 lbs.

A third master batch was prepared by masticating on a dry mill 24 lbs. of raw rubber and mixing with it the following compounds—

| | |
|---|---|
| Stearic acid | 2 lbs. |
| Zinc oxide | 18 lbs. 12 ozs. |
| Mercapto - benzothiazole-accelerator | 5 lbs. 10 ozs. |
| Rubber antioxidant | 4 lbs. | giving a masticated batch of total weight 54 lbs. 6 ozs.

7 ozs. of the first master batch, 3 ozs. 2 drams of the second master batch and 2 lbs. 3 ozs. of the third master batch, in all 2 lbs. 13 ozs. 2 drams were then amalgamated by passing a few times through a dry mill with unheated rolls.

The above 2 lbs. 13 ozs. 2 drams of mixed master batches (containing 1½ lbs. masticated rubber) were then taken and passed a few times (say half-a-dozen) through the unheated rolls of a dry mill with 13½ lbs. of raw rubber to effect preliminary adhesion of the mixed master batches to the raw rubber. As explained above this does not cause serious heating of the raw rubber.

The material was then treated on a first stage wet mill consisting of two or more rollers, grooved, patterned or smooth with water sprayed or poured on the rolls, thus allowing the rubber to pass through the nip of the rolls without heating or becoming subject to friction or a destructive tearing action, and so preventing a break-down in its strength. After completion of the treatment on this wet mill, the material was treated, in succession, on three further wet mills having rolls set progressively closer together, producing as a final product a crepe of the required thickness and with the compounds uniformly distributed in it. The crepe was then dried.

The crepe was then laminated to the required thickness and compressed by being passed through the nip of steel rollers, hard rubber, or any other hard surfaced rollers, and vulcanisation of the sheet was carried out by wrapping it on a metal drum with cotton cloth, and then subjecting it for 1 hour to live steam at a gauge pressure of 15 lbs. per sq. in.

The final vulcanised product of the process according to the invention is very considerably more resistant to tear than vulcanized rubber made by mastication in a dry mill according to normal practice, the comparison being made between sheets of the same thickness, of the same type and quality of rubber, containing compounds (and other ingredients if desired) of the same character and proportionate quantity. If it is damaged by a nail or sharp edge, or pierced by a bullet, the damage is localised, whereas with rubber articles made by the ordinary mixing process, a tear or cut is liable to run through the sheet or other article. The product of our process has been found to have a greater resistance of abrasion than those made by the normal mixing process, and also, unlike normal vulcanised rubber, to swell quickly when exposed to hydrocarbon fuel which renders it suitable for the manufacture of self-sealing fuel tanks.

In some cases we may include in the mix a proportion of reclaimed rubber in addition to the raw rubber and compounds.

What we claim as our invention and desire to secure by Letters Patent is:

1. A process for the manufacture of tear-resistant rubber from raw rubber, which comprises the steps of preparing a master batch consisting of a concentrated mixing of raw rubber and the compounds required for vulcanisation, admixing at least a part of the master batch with a considerably large quantity of raw rubber and processing the resultant mix on a wet mill to form a crepe or sheet in which the compounds are uniformly distributed throughout a mass of rubber, the bulk of which is of substantially unbroken structure, and therafter vulcanising the rubber so obtained.

2. A process for the manufacture of tear-resistant rubber from raw rubber, which comprises the steps of preparing a master batch consisting of a concentrated mixing of raw rubber and the compounds required for vulcanisation, admixing on a dry mill and without excessive heating at least a part of the master batch with considerably larger quantity of raw rubber, processing the resultant mix on a wet mill to form a crepe or sheet in which the compounds are uniformly distributed throughout a mass of rubber, the bulk of which is of substantially unbroken structure, and thereafter vulcanising the rubber so obtained.

3. In a process for the manufacture of tear-resistant rubber from raw rubber, the steps of preparing a master batch by uniformly admixing the compounds required for vulcanization with rubber, and admixing at least a part of the master batch with a considerably larger quantity of raw rubber and processing the same on a wet mill to form a crepe or sheet the bulk of which is substantially unmasticated rubber, having particles of the master batch embedded therein and distributed throughout the same.

4. In a process for the manufacture of tear-resistant rubber from raw rubber, the steps of preparing a master batch comprising rubber having the compounds required for vulcanization thoroughly distributed therethrough, and admixing at least a part of the master batch with a considerably larger quantity of raw rubber and milling the same between rollers with reduction and regulation of friction upon and heating of the rubber to form a crepe the bulk of which is substantially unmasticated rubber, having particles of the master batch embedded therein and distributed therethrough.

5. As a new article of manufacture, vulcanized rubber, the major part of which is substantially unmasticated, and having distinguishable particles of rubber containing vulcanising compounds distributed therethrough, said rubber when in sheet form having a markedly greater resistance to tearing than vulcanized sheets of the same quality of masticated rubber in which all contained compounds and other ingredients are of the same character and proportionate quantity as in the said rubber.

6. As a new article of manufacture, vulcanized sheet rubber at least the major part of which is substantially unmasticated, and having distinguishable particles of vulcanizing compounds distributed with substantial uniformity therethrough.

BERNARD WILKINSON.
GEOFFREY DENNIS INGRAM.
HARRY WAUMSLEY.